Patented Apr. 20, 1926.

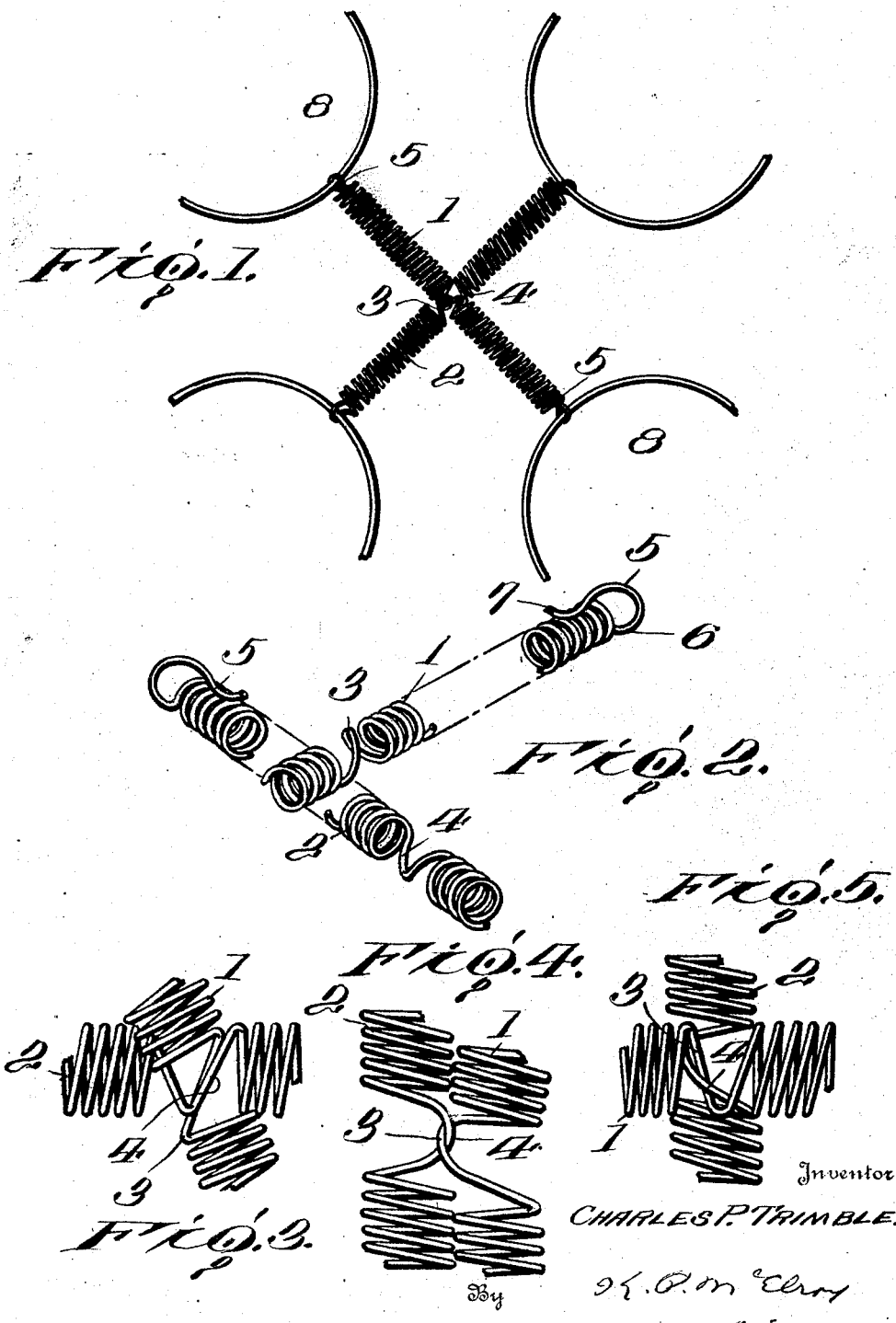

1,581,523

UNITED STATES PATENT OFFICE.

CHARLES P. TRIMBLE, OF PITTSBURGH, PENNSYLVANIA, ASSIGNOR TO FORT PITT BEDDING COMPANY, OF PITTSBURGH, PENNSYLVANIA, A CORPORATION OF PENNSYLVANIA.

DUPLEX SPRING.

Application filed November 24, 1924. Serial No. 751,976.

*To all whom it may concern:*

Be it known that I, CHARLES P. TRIMBLE, a citizen of the United States, residing at Pittsburgh, in the county of Allegheny and State of Pennsylvania, have invented certain new and useful Improvements in Duplex Springs, of which the following is a specification.

This invention relates to duplex springs and it comprises two coil spring members each having one turn intermediate its ends of greater pitch than the other turns to provide a space which is preferably equal at least to the outside diameter of the other member, whereby the two members may be interlocked at the spaced points with a convolution space of one of the members fitting in the convolution space of the other member; all as more fully hereinafter set forth and as claimed.

In several arts it is customary to unite separate supports by means of coiled springs, as for instance in the art of making bed springs. Certain types of bed springs comprise vertical spiral springs, the tops of which are connected by means of horizontal, usually smaller, helical springs. The assembling of such bed springs is a difficult and arduous task. Horizontal helical springs when used are usually interlocked and this is done in the manufacture of the springs by threading one spring into the other. This is a time consuming operation and the duplex spring thus made does not have the axis of the two members in exactly the same horizontal plane. The thickness of the wire prevents this. It has been proposed to unite helical springs by bending each spring at substantially right angles and hooking one spring over the other, but there are certain disadvantages in this construction, the main one being that the springs are not actually interlocked. That is to say one convolution of one spring does not completely surround the convolutions of the other spring. Among other objects of my invention is the provision of a duplex spring, the parts of which may be easily and quickly assembled, the provision of a duplex spring in which the members may be securely interlocked in transverse arrangement with the axis of each member extending in substantially a straight line; and the provision of a duplex spring, the two members of which are securely interlocked with the axis in the same horizontal or same vertical plane.

In the accompanying drawing showing one form of a specific embodiment of my invention Fig. 1 is a top plan view showing the two members of the duplex spring in interlocking transverse engagement with the extremity of each member in engagement with the top of a spiral spring.

Fig. 2 is a perspective view showing in detail the formation of hooks at the end of the spring members for facilitating their attachment to spiral springs or other supports;

Fig. 3 is a view showing in detail the central portions of the members as they appear when they are to be assembled;

Fig. 4 is a view showing in detail the central portion of the members as they appear during the step of assembling; and Fig. 5 is a detailed view of the central portions of the members as they appear in the final assembled position.

Referring to the drawings, a pair of closely coiled helical springs 1 and 2 are made with spaced sections intermediate their ends. This may be done by forming the convolutions 3 and 4 of each spring of greater pitch than the convolutions at the ends. Each member, as shown, is provided at it's end with a hook portion 5. Each of the hooked portions is bent to contact with the outer surface of the helical member as at 6 and has an outwardly bent end 7 for engagement with a convolution 8 of supports to be united, such for instance as upright spiral coils of a bed spring as shown in Fig. 1.

The convolutions 3 and 4 of the helical members are of greater pitch than the convolution 5 at the ends and are advantageously of such a pitch as to provide a space which is, at least, equivalent to the diameter of the convolutions so that when the members are assembled the convolution of one may fit in the convolution space of the other.

In assembling the members 1 and 2 they are placed at substantially right angles to each other as shown in Fig. 3. The extended convolutions 3 and 4 of the springs assume the relative position shown in Fig. 2. Members 1 and 2 are then engaged at their central portions as shown in Fig. 4, the longitudinal axes of such springs being substantially parallel. One of the springs is then twisted relative to the other to an angle approximately 180° and the axis of the two springs then allowed to assume positions approximately in the same horizontal plane, but at right angles to each other. The two members are thus firmly interlocked so that a convolution of one entirely surrounds a single convolution of the other at the spaced points and so that one spring lies entirely in the spaced portion of the other spring.

It is to be noted from the inspection of Fig. 1 that the members 1 and 2 extend in straight lines between adjacent bed spring coils by which they are connected. The strain is thus evenly distributed throughout their lengths and not centralized at the point of connection of the two members.

The invention provides a simple spring connector which is inexpensive in construction and which is easy to assemble and apply to members which are to be connected, and which, furthermore, cannot be accidentally displaced or unfastened.

The provision of this duplex spring saves a great amount of time in the assembling of the two parts and in the assembling of the duplex spring with the coils of a bed spring.

What I claim is:—

1. A duplex spring comprising two coiled members each having close convolutions at its ends and a spaced convolution intermediate its ends, the two members being interlocked at the points of the spaced convolutions and the two ends of each member being in substantial alignment.

2. A duplex spring comprising two coiled members each having close convolutions at its ends and a spaced convolution intermediate its ends, the two members being interlocked at the points of the spaced convolutions, one such member being twisted with respect to the other, so that the spaced convolutions overlap, and the two ends of each member being in substantial alignment.

3. A duplex spring comprising two crossed tightly coiled members each having intermediate its ends a spaced convolution and interlocked at the spaced points with the axes of the members intersecting.

4. A duplex spring comprising two coiled members having one coil intermediate the ends of greater pitch than the other coils, to provide a space equal at least to the outside diameter of the members, whereby the two may be connected at the spaced points with one spring fitting in the said space of the other spring.

5. A spring connector comprising two helical springs closely coiled at their ends and provided with a space centrally thereof, the central portions of said springs being interlocked; the said interlocked springs each extending in a straight line between two supports; means for attaching said springs to supports, said means comprising end portions integral with said springs and reversely bent to contact with the outer convolutions of the respective springs, and having ends flared outwardly from such point of contact.

6. In bed spring construction a coiled spring connector having its ends reversely bent to contact with the outer surface of said connector, and then bent outwardly to provide an engaging and guiding means for facilitating attachment of the connector to a bed spring.

In testimony whereof, I have hereunto affixed my signature.

CHARLES P. TRIMBLE.